United States Patent Office 3,448,192
Patented June 3, 1969

3,448,192
PHARMACEUTICAL COMPOSITIONS CONTAINING PHENYL ETHYL PIPERAZINES
Roland Yves Mauvernay, 13 Rue Eugene Gilbert, 63 Riom, France
No Drawing. Filed Mar. 9, 1966, Ser. No. 532,841
Claims priority, application Great Britain, Mar. 9, 1965, 9,981/65
Int. Cl. A61k 17/04; C07d 51/70
U.S. Cl. 424—250                                      8 Claims

ABSTRACT OF THE DISCLOSURE

Therapeutic compositions of phenyl ethyl piperazines.

---

The present invention relates to novel chemical compounds of the piperazine class possessing interesting properties, especially analgesic, anti-histaminic, sedative and anti-tussive, which can be made into useful medicaments, and also to processes for their preparation.

According to the invention there are provided novel piperazines of the general formula:

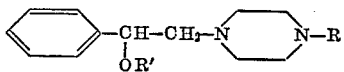

in which R represents a phenyl or a halogenophenyl radical, a 2- or 4- ethyl-pyridyl radical, or a kentonic radical, of the form:

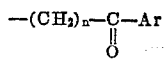

with $n=1, 2$ or $3$
or

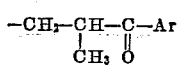

where Ar represents a phenyl, thienyl, halogenophenyl, alkylphenyl, alkoxyphenyl or alkenyloxy, and R′ represents a lower alkyl radical, and their acid addition salts.

The acid additional salts are salts are particularly those with pharmaceutically acceptable acids.

It is also an object of this invention to provide addition salts of substances corresponding to the general formula 1 with pharmaceutically acceptable acids.

Another aspect of the invention comprises the preparation of novel piperazines according to the aforementioned general formula by the methods hereinafter described.

A further aspect of the invention comprises the administration to an animal of a piperazine according to the aforementioned general formula to produce pharmacological effects such as analgesia or anti-histaminic, sedative, anti-tussive, anti-depressant or anti-inflammary action.

According to a further feature of the invention there are provided pharmaceutical compositions comprising a piperazine according to the aforementioned general formula.

The preparation of substances according to the general formula consists of preparing the 2-phenyl 2-alkoxy ethylbromide by treating vinylbenzene (styrene) in the cold with the corresponding alcohol R′ —OH in the presence of tertiarybutyl hypobromite.

One can then either cause this compound to react with an excess of piperazine to obtain a 1-(2-phenyl 2-alkoxy) ethyl piperazine of the general formula:

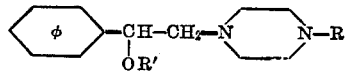 (II)

One then reacts the product corresponding to (II) either the form of the dihydrochloride with a ketone and formaldehyde according to the method of Mannich, or with 2- or 4-vinylpyridine in the presence of acetic acid in ethanol or reacts 2-phenyl 2-alkoxy ethyl bromide with a 1-phenyl or 1-4 halogenophenyl piperazine.

By way of examples, there are indicated in Tables IA to IF below, a certain number of compounds as well as their characteristics.

TABLE IA

R of type 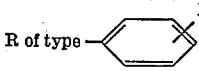

| Compound No. | R′ | R | Salt | Melting Point, °C. | N Percent, Calcul. | N Percent, Found |
|---|---|---|---|---|---|---|
| 1 | —CH₃ | ⟨⟩—Cl | Hydrochloride | 179 | 7.62 | 7.55 |
| 2 | —C₂H₅ | ⟨⟩—Cl | ....do.......... | 140 | 7.32 | 7.26 |
| 3 | —CH₃ | ⟨⟩—F | ....do.......... | 159 | 8.02 | 8.05 |

TABLE IB
R of type —CH$_2$—CH$_2$—A

| Compound No. | R' | A | Salt | Melting Point, °C. | N Percent, Calcul. | N Percent, Found |
|---|---|---|---|---|---|---|
| 4 | —CH$_3$ | pyridyl (3-) | Trihydrochloride | 172 | 9.65 | 9.62 |
| 5 | —C$_2$H$_5$ | pyridyl (3-) | do | 170 | 9.36 | 9.27 |
| 6 | —CH$_3$ | pyridyl (2-) | do | 175 | 9.64 | 9.68 |
| 7 | —CH$_2$—CH(CH$_3$)$_2$ | pyridyl (2-) | do | 176 | 8.82 | 8.87 |
| 8 | —CH$_2$—CH(CH$_3$)$_2$ | pyridyl (3-) | do | 172 | 8.82 | 8.84 |

TABLE IC
R of type —CH$_2$—CH$_2$—CH$_2$—C(=O)—Ar

| Compound No. | R' | Ar | Salt | Melting Point, °C. | N Percent, Calcul. | N Percent, Found |
|---|---|---|---|---|---|---|
| 9 | —C$_2$H$_5$ | —C$_6$H$_4$—Cl | Dihydrochloride | 205 | 5.74 | 5.78 |
| 10 | —CH$_3$ | —C$_6$H$_4$—F | do | 193 | 6.12 | 6.09 |
| 11 | —CH$_3$ | —C$_6$H$_4$—Cl | do | 200 | 5.91 | 5.94 |
| 12 | —C$_2$H$_5$ | —C$_6$H$_4$—F | do | 191 | 5.94 | 5.89 |
| 13 | —C$_3$H$_7$ (n) | —C$_6$H$_4$—F | do | 188 | 5.77 | 5.75 |
| 14 | —C$_4$H$_9$ (n) | —C$_6$H$_4$—F | do | 186 | 5.61 | 5.65 |

TABLE ID
R of type —CH$_2$—CH(CH$_3$)—C(=O)—Ar

| Compound No. | R' | Ar | Salt | Melting Point, °C. | N Percent, Calcul. | N Percent, Found |
|---|---|---|---|---|---|---|
| 15 | —C$_2$H$_5$ | —C$_6$H$_5$ | Dihydrochloride | 160 | 6.18 | 6.03 |
| 16 | —CH$_3$ | —C$_6$H$_4$—OC$_2$H$_5$ | do | 183 | 5.65 | 5.57 |
| 17 | —CH$_3$ | —C$_6$H$_5$ | do | 167 | 6.37 | 6.30 |
| 18 | —CH$_3$ | thienyl | do | 156 | 6.20 | 6.22 |
| 19 | —C$_2$H$_5$ | thienyl | do | 148 | 6.10 | 6.08 |
| 20 | —C$_2$H$_5$ | —C$_6$H$_4$—Cl | do | 186 | 5.74 | 5.70 |

TABLE ID—Continued

| | R' | Ar | Salt | Melting Point, °C. | N Percent, Calcul. | N Percent, Found |
|---|---|---|---|---|---|---|
| 21 | —CH₂—CH₂—CH(CH₃)CH₃ | phenyl | ......do............ | 169 | 5.66 | 5.57 |
| 22 | —CH₂—CH(CH₃)CH₃ | thienyl | ......do............ | 163 | | 5.60 |
| 23 | —(CH₂)₂—CH(CH₃)CH₃ | thienyl | ......do............ | 154 | | 5.70 |
| 24 | —C₂H₅ | —⟨⟩—OCH₃ | ......do............ | 197 | 5.79 | 5.70 |
| 25 | —CH₃ | —⟨⟩—Cl | ......do............ | 180 | 59.1 | 5.86 |
| 26 | —CH₃ | —⟨⟩—OCH₃ | ......do............ | 196 | 5.97 | 5.96 |
| 27 | —CH₂—CH(CH₃)CH₃ | —⟨⟩—Cl | ......do............ | 175 | 5.43 | 5.43 |
| 28 | —CH₂—CH(CH₃)CH₃ | —⟨⟩—OCH₃ | ......do............ | 170 | 5.47 | 5.52 |
| 29 | —CH₃ | —⟨⟩—F | ......do............ | 182 | 6.12 | 6.18 |
| 30 | —(CH₂)₂—CH(CH₃)CH₃ | —⟨⟩—Cl | ......do............ | 168 | 5.27 | 5.28 |
| 31 | —C₂H₅ | —⟨⟩—F | ......do............ | 176 | 5.94 | 5.93 |
| 32 | —(CH₂)₂—CH(CH₃)CH₃ | —⟨⟩—OCH₃ | ......do............ | 166 | 5.33 | 5.41 |
| 33 | —(CH₂)₂—CH(CH₃)CH₃ | —⟨⟩(CH₃O)—OCH₃ | ......do............ | 153 | 5.17 | 5.17 |

TABLE IE

R of type —CH₂—CH₂—C(=O)—Ar

| | R' | Ar | Salt | Melting Point, °C. | N Percent, Calcul. | N Percent, Found |
|---|---|---|---|---|---|---|
| Compound No.: | | | | | | |
| 34 | —C₂H₅ | phenyl | Dihydrochloride.... | 160 | 6.37 | 6.33 |
| 35 | —C₂H₅ | thienyl | ......do............ | 166 | 6.29 | 6.25 |
| 36 | —CH₃ | thienyl | ......do............ | 167 | 6.49 | 6.43 |
| 37 | —CH₃ | —⟨⟩—Cl | ......do............ | 166 | 6.09 | 6.10 |
| 38 | —C₂H₅ | —⟨⟩—Cl | ......do............ | 165 | 5.91 | 5.88 |

TABLE IE—Continued

| | R' | Ar | Salt | Melting Point, °C. | N Percent, Calcul. | N Percent, Found |
|---|---|---|---|---|---|---|
| 39 | —C₂H₅ | —OCH₃ | do | 162 | 5.96 | 5.92 |
| 40 | —C₂H₅ | —CH₃ | do | 163 | 6.17 | 6.15 |
| 41 | —CH₃ | 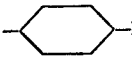—F | do | 170 | 6.32 | 6.30 |
| 42 | —CH₃ | 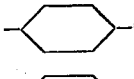—OCH₃ | do | 158 | 6.16 | 6.15 |
| 43 | —CH₃ | 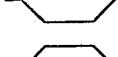 | do | 172 | 6.58 | 6.53 |
| 44 | —C₂H₅ | —F | do | 164 | 6.12 | 6.05 |
| 45 | —CH₂—CH(CH₃)₂ | 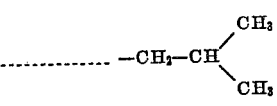 | do | 158 | 5.99 | 5.91 |
| 46 | —CH₂—CH(CH₃)₂ | 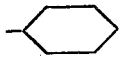—Cl | do | 165 | 5.58 | 5.54 |
| 47 | —CH₂—CH(CH₃)₂ | 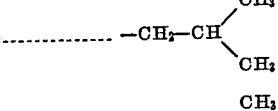—F | do | 156 | 5.77 | 5.71 |
| 48 | —CH₂—CH(CH₃)₂ | 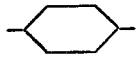—OCH₃ | do | 172 | 5.63 | 5.69 |
| 49 | —CH₂—CH(CH₃)₂ | 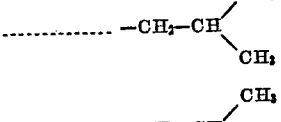 CH₃O, —OCH₃ | do | 162 | 5.31 | 5.29 |
| 50 | —CH₂—CH(CH₃)₂ | 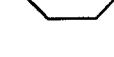 (thiophene) | do | 164 | 5.91 | 5.83 |
| 51 | —CH₂—CH₂—CH(CH₃)₂ |  | do | 170 | 5.82 | 5.85 |
| 52 | —CH₂—CH₂—CH(CH₃)₂ | 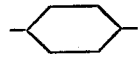—Cl | do | 175 | 5.40 | 5.43 |
| 53 | —CH₂—CH₂—CH(CH₃)₂ | 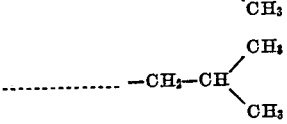—F | do | 170 | 5.60 | 5.64 |
| 54 | —CH₂—CH₂—CH(CH₃)₂ | 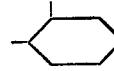—OCH₃ | do | 151 | 5.47 | 5.42 |
| 55 | —CH₂—CH₂—CH(CH₃)₂ | 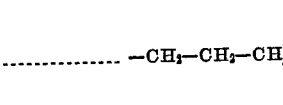 (thiophene) | do | 160 | 5.74 | 5.64 |
| 56 | —CH₃ | 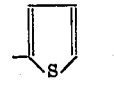 OCH₃, OCH₃, OCH₃ | do | 192 | 5.43 | 5.44 |

TABLE IE—Continued

| R' | Ar | Salt | Melting Point, °C. | N Percent, Calcul. | N Percent, Found |
|---|---|---|---|---|---|
| 57  —C₂H₅ | ![structure with OCH₃, OCH₃, OCH₃] | ..do.. | 192 | 5.29 | 5.19 |
| 58  —CH₃ | ![structure with OC₃H₅] | ..do.. | 162 | 5.82 | 5.79 |

TABLE IF
R of type —CH₂—C—Ar

| | R' | Ar | Salt | Melting Point, °C. | N Percent, Calcul. | N Percent, Found |
|---|---|---|---|---|---|---|
| Compound No.: | | | | | | |
| 59 | —CH₃ | ![phenyl-Cl] | Dihydrochloride | 197 | 6.28 | 6.24 |

The compounds according to the invention are prepared by reacting a 1-(2-phenyl-2-alkoxy)-ethyl-piperazine with a ketone and fomaldehylde (Mannich reaction) or with 2- or 4-vinyl-pyridine, according to the significance of R in the preceding formula.

The 1-(2-phenyl-2-alkoxy)-ethylpiperazine starting material is obtained by the action of piperazine on 2-phenyl-2-alkoxy-ethyl bromide. The latter may be obtained by the reaction of styrene on the corresponding alcohol R'—OH, in the presence of tertiary butyl hypobromite.

According to another feature of the process of the invention, 2-phenyl-2-alkoxy ethyl bromide may be reacted directly with a 1-phenyl- or a 1,4-halogeno-phenyl-piperazine.

Below are given examples of the preparation of these compounds:

Example 1.—Preparation of 1-(2-phenyl 2-methoxy)-ethyl piperazine 107.5 g. (0.5 M) of 2-phenyl 2-methoxy ethyl bromide and 107 g. (1.25 M) of anhydrous piperazine in 300 ml. ethanol are heated under reflux 6 to 7 hours.

After cooling, the piperazine dihydrobromide is filtered and the ethanol removed under vacuum. The oily residue is taken up in 200 ml. of water acidified with concentrated HCl, the aqueous solution is filtered and washer with ether; it is made alkaline with NaOH in 50% aqueous solution and then reextracted with ether. The ethereal phase is washed with water saturated with NaCl. After drying over anhydrous Na₂SO₄, the product is distilled under vacuum. 70 g. of product are obtained, representing a yield of 63.5%.

The 1-(2-phenyl 2-ethoxy)-ethyl piperazine derivative and other homologues are obtained under analogous conditions.

The characteristics of these compounds are given in the following Table II:

Example 2.—Preparation of 1-(2-phenyl 2-methoxy) ethyl 4-(3-phenyl propane-3-one) piperazine dihydrochloride (Compound No. 43)

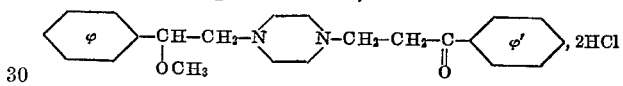

59.6 g. (0.2 M) of 1-(2-phenyl 2-methoxy) ethyl piperazine dihydrochloride, 29 g. (0.24 M) of acetophenone, 7.5 g. (0.25 M) of trioxymethylene, 100 ml. ethanol and 0.4 ml. concentrated HCl are refluxed on an oil bath for four to five hours. On cooling the product crystallizes. It is dried, then washed with a little ethanol. It is recrystallized from ethanol yielding 62 g. of white crystallized powder, soluble in water.

Yield: 73%. Melting point: 172°. N percent calc.: 6.58, Cl percent calc. 16.7, N percent found: 6.53. Cl percent found 16.6.

Purity checked by chromatography on a thin silica film.

Example 3.—Preparation of 1-(2-phenyl 2-ethoxy) ethyl 4-(3-phenyl 2-methyl propane-3-one) piperazine dihydrochloride (Compound No. 15)

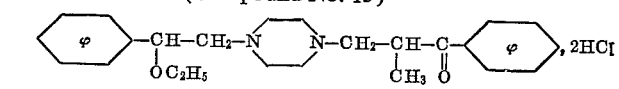

61.4 g. of 0.2 M of 1-(2-phenyl 2-ethoxy) piperazine dihyrochloride, 33.5 g. (0.25 M) propiophenone, 75 g. (0.25 M) trioxymethylene, 120 ml. of ethanol and 0.4 ml. of concentrated HCl are heated under reflux for 4 to 5 hours. The product is allowed to crystallize, then filtered and washed with alcohol. It is dried and recrystallized from methanol obtaining 10% H₂O.

There is thus obtained 60 g. of a white crystalline powder soluble in water.

Yield: 66%. Melting point: 160°. N percent calc.: 6.18; Cl percent calc.: 15.6, N percent found: 6.03. Cl percent found: 15.45.

The product was pure by chromatography on thin silica layers.

TABLE II

| R | E (°C.) | $n_D°$ | Appearance | N percent calcul. | N percent Found |
|---|---|---|---|---|---|
| —CH₃ | E₁₄=166 | $n_D^{20°}=1.5321$ | Colourless viscous oil, carbonating in air. | 12.72 | 12.68 |
| —C₂H₅ | E₁₄=174 | $n_D^{20°}=1.5260$ | Id | 11.97 | 11.95 |
| —C₃H₇(n) | E₁₂=172 | $n_D^{20.8°}=1.5205$ | Id | 11.29 | 11.32 |
| —C₄H₉(n) | E₁₂=180 | $n_D^{20.8°}=1.5170$ | Id | 10.68 | 10.68 |
| —C₄H₉(i) | E₁₂=170 | $n_D^{21°}=1.5150$ | Id | 10.68 | 10.65 |
| —C₅H₁₁(i) | E₁₂=182 | $n_D^{21°}=1.5095$ | Id | 10.14 | 10.15 |

Example 4.—Preparation of trihydrochloride of 1-(2-phenyl 2-ethoxy) ethyl 4-(4-pyridyl) ethyl piperazine (Compound No. 5)

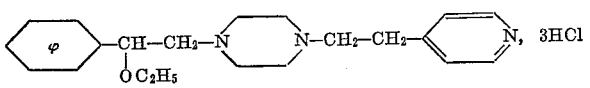

23.4 g. (0. M) of 1-(2-phenyl 2-ethoxy) ethyl piperazine, 10.5 g. (0.1 M) of 4-vinyl pyridine, 12 g. of glacial acetic acid, 60 ml. absolute alcohol, are refluxed for 20 hours.

The alcohol is driven off and the brown viscous residue is taken up with cold water. It is made alkaline with 50% aqueous NaOH. It is extracted with ether, the ethereal-phase washed with water saturated with NaCl, and dried over anhydrous $Na_2SO_4$. After removing the ether, there remained a very viscous brown oil which could not be distilled.

The residue was taken up in 90% alcohol, acidified with gaseous HCl; on cooling the product is crystallized. It was recrystallized twice in 90% alcohol to obtain 21 g. white crystalline powder readily soluble in water.

Yield: 47%. Melting point: 170° (with decomposition). N percent calc.: 9.36, N percent found: 9.27. Cl percent calc. 23.6, N percent found: 9.27. Cl percent found: 23.4.

Example 5.—Preparation of 1-(4-chloro)-phenyl 4-(2-phenyl 2-methoxy) ethyl piperazine hydrochloride (Compound No. 1)

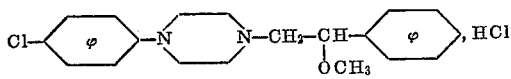

98 g. (0.5 M) of 1-(4-chloro)-phenyl piperazine and 54 g. of (2-phenyl 2-methoxy) ethyl bromide are heated under reflux with agitation in 250 ml. of toluene for 8 hours. After cooling, the hydrobromide of 1-(4-chloro)-phenyl piperazine is filtered and the toluene driven off under vacuum. The oily residue crystallized. It was recrystallized in methanol to obtain 55 g. of a white powder.

Yield: 60%. Melting point: 102° C. N percent calc. 8.47, N percent found: 8.48.

The hydrochloride is prepared in absolute ethanol with gaseous HCl.

Melting point: 179°. N percent calc.: 7.62, N percent found: 7.55.

Example 6.—Preparation of 1-(2-phenyl-2-ethoxy)-ethyl-4-(4-chloro)-phenyl butane-4-one) piperazine dihydrochloride (Compound No. 9)

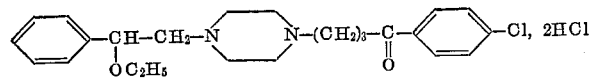

A mixture of 1-(2-phenyl-2-ethoxy)-ethyl-piperazine, 23.5 g. (0.1 mole), and 1-(4-chloro-phenyl-4-chloro butane-3-one, 11 g. (0.5 mole) and 80 ml. of toluene are heated under reflux for eight hours.

The solvent is removed, the residue taken up in ether, and washed with water saturated with NaCl. It is extracted with aqueous 2 N HCl. The dihydrochloride formed crystallises. The precipitate is taken up again by suspension in water, and NAOH is added to liberate the base. The material is taken up again in ether. The ethereal solution is dried over anhydrous $Na_2SO_4$.

After evaporation of the solvent the residue is taken up again in absolute ethanol and dry HCl gas. The dihydrochloride crystallises. It is recrystallized in 96° ethanol.

White crystals very slightly soluble in water.

Melting point: 205° C. N percent calc.: 5.74, N percent found: 5.78.

Example 7.—Preparation of 1-(2-phenyl-2-methoxy)-ethyl - 4-(2-(4-chloro)-phenyl-ethane-2-one)-piperazine dihydrochloride (Compound No. 59)

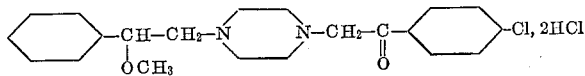

A mixture of 22 g. (0.1 mole) of 1-(2-phenyl-2-ethoxy)-ethyl-piperazine, 11.5 g. (0.05 mole) of alpha-bromo-(4-chloro)-acetophenone and 80 ml. of toluene are refluxed for eight hours.

The solvent is distilled off under vacuum. After cooling, the residue is taken up in ether, and filtered giving the hydrobromide of 1-(2-phenyl-2-ethoxy)-ethyl-piperazine. The ether is removed, the oily residue taken up in absolute alcohol and gaseous HCl: the dihydrochloride crystallises. After recrystallisation in ethanol, there are obtained white crystals slightly soluble in cold water.

Melting point: 197° C. N percent calc.: 6.28, N percent found: 6.24.

The compounds according to the invention possess a group of pharmacological properties, which have been assessed by the following methods:

analgesic action
antihistmanic action
action of the autonomic nervious system
catatonigenic action
hypothermisant action
anti-Straub action (morphinic syndromes, or Straub reaction)
protection against lethal doses (i.v.) of adrenaline or noradrenaline.

There are given below in Table III, for certain number of the compounds according to the invention, the numerical values of these properties, evaluated according to the following test procedures:

(A) *Acute toxicity*.—$LD_{50}$: method of B. Behrens and C. Karber (Arch. F. Path. Pharm. 177, 379, 1935) orally in the mouse; it is expressed in mg./kg.

(B) *Analgesic action*.—Shown by 2 methods:

(a) Caloric stimulus: method of d'Eddy and Leimbach, D. (J. Pharmacol. Exp. Ther., 107, 385, 393, 1953). $ED_{50}$=the dose which increases the time of exposure of the treated animals by more than 5 seconds with respect to the time of exposure of the control animals.

(b) Chemical stimulus: method of Koster modified by Witkin (Koster R., Anderson and De Beer, E. J., Fed. Proc., 18, 412, 1959) and Witkin, L. B., Heubner, C. F., Galdi, F., O'Keefe, E., Spitaletta, P., and Plummer, A. J., J. Pharmacol. Exp. Ther., 133, 400, 408, 1961. $ED_{50}$=analgesia of 50%, this being a decrease of 50% in number of pain crises in the treated animals with respect to the control animals.

(C) *Anti-histaminic action*.—Studied by the method of protection against bronch-spasm induced in the guinea pig by histamine aerosol. The dose used is 1/20 of the $LD_{50}$.

In the table:

I=inactive; S.A=product does not completely protect the animals. The dose indicated is that which protects the animals, completely against histamine aerosol (the protection is considered as complete when the increase in the time of exposure is greater than ten minutes).

(D) *General sedation*.—

(a) Turning rod or Rotarod: Tripod, J., Struder, A., Meier, R. (Arch. Int. Pharmaco., 112, 319, 1957).

(b) Evasion or climbing test: Kneip, P., Arch. Int. Pharmaco., 1960, 126, 228.

(c) Chimney: Boissier, J. R., Tardy, J., Diverres, J. C. Medic. Exp. 3, 81, 1960.

(d) Catatonigenic action in the rat: the rear paws of the rats are placed on corks 2 cm. in height. The animals which retain this uncomfortable position for 2 minutes are considered as catatenigenic.

(3) Code adopted:

+++++: very active
++++: active
+++: average activity
++: slight activity
+: 
0: inactive.

(E) *Anti-tussive action.*—Method of Domenjoz, R., Arch Exp. Pathol. u. Pharmakol., 215, 19 1952.

Code adopted:

0: inactive
+: decrease of 15–25% of the amplitude of shakes of coughing induced by excitation of the larynigeal nerve.
++=decrease of 25 to 50%
+++=decrease of 50 to 75%
++++=decrease of 75% to abolition.

(F) *General Effects.*—studied in the anesthetised dog and rabbit:

By recording the arterial pressure, the respiratory rhythm, intestinal motility.

By studying the adrenal and noradrenal hypertension and the cardiomoderation induced by excitation of the peripheral end of the pneumo-gastric nerve.

In the table:

TA=arterial tension
A=adrenal hypertension
NA=noradrenal hypertension
↓=decrease in hypertension.

(G) *Anti-inflammatory action.*—Kaolin oedema in the rat, method of Wolhelm and Domenjoz (Arzneimittel Forsch., 1, 151, 1951).

There are assembled in Table III below the results of these tests carried out on a certain number of the compounds carried to the invention, identified with reference to Tables IA to IF.

TABLE III

| Compound No.: | $LD_{50}$ p.o. mg./kg. | Analgesic $ED_{50}$ acid plate | Anti-histaminic | General sedation | Anti-tussive | General effects | Anti-inflammatory (kaolin) percent |
|---|---|---|---|---|---|---|---|
| 35 | 584 | S.A. | S.A. | S.A. | + | +++ | 0 | |
| 36 | 834 | I | I | I | ++ | + | 0 | 44 |
| 15 | 730 | 150 | 150 | I | + | [1]++++ | 0 | |
| 37 | 1,025 | S.A. | I | 12.5 | ++ | +++ | 0 | |
| 38 | 501 | S.A. | S.A. | 12,5 | ++ | 0 | 0 | |
| 39 | 219 | S.A. | 20 | 10 | + | ++ | 0 | |
| 40 | 542 | S.A. | I | S.A. | ++ | + | 0 | |
| 41 | 563 | S.A. | I | 12,5 | ++ | 0 | →A→NA | |
| 42 | 438 | I | I | 10 | ++ | 0 | →A→NA | 36 |
| 43 | 883 | 100 | 100 | [2]6 | + | 0 | 0 | |
| 44 | 313 | S.A. | I | 7,5 | + | + | →A | |
| 16 | 552 | S.A. | S.A. | S.A. | + | ++ | 0 | |
| 17 | 921 | I | I | 37 | + | ++ | →A | 36 |
| 4 | 1,250 | 50 | 50 | | ++ | | →vague | |
| 5 | 667 | 50 | 50 | | +++ | | (3) | |
| 1 | >3,000 | 250 | 30 | + | + | ++ | + | 44 |
| 2 | >2,000 | 125 | 125 | 0 | + | 0 | + | |
| 3 | 1,750 | 125 | 65 | + | ++ | 0 | →A→NA | |
| 6 | 917 | S.A. | I | | + | | →A | |
| 7 | 360 | I | S.A. | | + | | 0 | |
| 8 | 280 | S.A. | S.A. | 0 | 0 | ++ | 0 | |
| 20 | 1,500 | S.A. | S.A. | S.A. | 0 | ++++ | →A→NA | |
| 21 | 2,000 | 200 | 200 | S.A. | 0 | +++ | | 62 |
| 24 | 730 | I | S.A. | S.A. | 0 | ++ | 0 | 37 |
| 25 | 917 | I | S.A. | 37 | 0 | 0 | 0 | |
| 26 | 875 | I | S.A. | 37 | 0 | 0 | 0 | 0 |
| 45 | 500 | I | 50 | S.A. | 0 | 0 | 0 | 0 |
| 46 | 2,017 | S.A. | 200 | S.A. | 0 | 0 | 0 | 55 |
| 47 | 750 | S.A. | I | S.A. | 0 | 0 | →A | 60 |
| 48 | 406 | S.A. | I | S.A. | 0 | 0 | 0 | 0 |
| 27 | >3,000 | 250 | 250 | S.A. | 0 | 0 | 0 | 51 |
| 28 | >3,000 | 150 | 100 | I | 0 | 0 | 0 | 53 |
| 49 | 500 | S.A. | S.A. | S.A. | 0 | | | |
| 50 | 500 | S.A. | I | S.A. | 0 | 0 | →A→NA | 38 |
| 51 | 1,500 | 75 | 75 | S.A. | 0 | 0 | 0 | 37 |
| 52 | 2,000 | S.A. | S.A. | 100 | 0 | 0 | 0 | 45 |
| 53 | 1,667 | S.A. | S.A. | S.A. | 0 | 0 | 0 | 50 |
| 29 | 875 | S.A. | S.A. | 37 | 0 | 0 | →Pressure | 37 |
| 54 | 2,005 | 250 | 250 | 125 | ++ | ++ | | 56 |
| 30 | >3,000 | I | 250 | I | 0 | 0 | 0 | 0 |
| 31 | 625 | I | I | I | 0 | +++ | | 33 |
| 32 | 3,000 | 250 | S.A. | S.A. | 0 | 0 | 0 | 0 |
| 33 | 1,250 | S.A. | 125 | S.A. | 0 | 0 | 0 | 56 |
| 55 | 2,000 | 200 | 200 | S.A. | 0 | ++++ | | 60 |
| 56 | 771 | S.A. | S.A. | 37 | | | →A→NA | 32 |
| 57 | 500 | S.A. | I | S.A. | 0 | 0 | 0 | 0 |
| 13 | 600 | 60 | 50 | S.A. | + | 0 | →A→NA | |
| 14 | 2,000 | | | S.A. | + | ++ | →vague | |
| 18 | 1,250 | I | I | S.A. | + | ++ | | 46 |
| 19 | 1,354 | I | I | I | + | ++ | →A→NA | 34 |
| 22 | >3,000 | S.A. | S.A. | S.A. | + | +++ | →A→NA | 22 |
| 23 | >2,000 | I | 250 | S.A. | + | + | →A→NA | 24 |
| 11 | 175 | I | S.A. | S.A. | + | ++++ | →A→NA | 0 |
| 9 | 203 | I | I | I | 0 | ++++ | →A→NA | 22 |
| 10 | 281 | I | S.A. | S.A. | + | +++ | →A | 18 |
| 12 | 295 | II | I | 10 | 0 | +++ | →A→NA | 24 |
| 34 | 552 | S.A. | S.A. | 20 | + | ++ | 0 | |
| 58 | 312 | S.A. | I | 15 | 0 | + | 0 | |
| 59 | 1,021 | I | 100 | 50 | ++ | +++ | →A→T | 46 |

[1] Codeine.
[2] Mepyramine.
[3] Pressure of 50% sympatholytic adrenaline antagonist.

It is concluded that the substances of this series are especially characterized by an anti-spasmodic action, exerted particularly on the musculature. At this level, they antagonise particularly the contracting effect of acetylcholine, barium chloride, histamine both in vitro (isolated bronchial fibre), and in vivo (bronchial resistance studied by the method of Konzette in the dog, protection against bronchospasm in the guinea pig). Their efficiency in the whole animal for the best of them is less than 10 mg./kg.

Their therapeutic application is such that of smooth muscle relaxants and counteracts spasm. Their interest is clearly in the bronchial domain.

They may be administered in the form of tablets containing 50, 100 and 150 mg., and suppositories containing 100 to 200 mg.

What I claim is:

1. A pharmaceutical composition comprising a therapeutically effective amount of a compound of the formula:

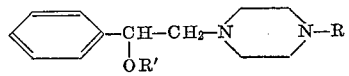

wherein R' is lower alkyl, R is a ketonic group of the formula:

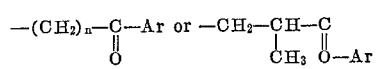

wherein $n$ is 1 to 3, and wherein Ar is phenyl, halophenyl, lower alkyl phenyl, lower alkenyl phenyl, lower alkoxy phenyl, or thienyl, and a pharmaceutical carrier.

2. A pharmaceutical composition as claimed in claim 1, in a dosage unit form comprising 50 to 200 mg. of said compound.

3. A pharmaceutical composition as claimed in claim 2, wherein the dosage unit form is a tablet containing 50 to 150 mg. of said compound.

4. A pharmaceutical composition as claimed in claim 2 wherein the dosage unit form is a suppository containing 100 to 200 mg. of said compound.

5. A pharmaceutical composition as claimed in claim 1 wherein R' is $CH_3$, $C_2H_5$, n-$C_3H_7$, n-$C_4H_9$, $-CH_2-CH-(CH_3)_2$ or $-(CH_2)_2-CH-(CH_3)_2$.

6. A pharmaceutical composition as claimed in claim 1 wherein Ar is p-chlorophenyl or p-fluorophenyl.

7. A pharmaceutical composition as claimed in claim 1 wherein Ar is p-methoxyphenyl, 2,4-dimethoxyphenyl or 3,4,5-trimethoxyphenyl.

8. A pharmaceutical composition as claimed in claim 1 wherein Ar is p-methylpheny.

References Cited

Chem. Abst., 60 (1964), p. 1774G.
Chem. Abst., 62, (1965), p. 4038E.
Chem. Abst., 62 (1965), pp. 11831D–11832.
Chem. Abst., 63 (1965), p. 2985G.

ALBERT T. MEYERS, *Primary Examiner.*

S. J. FRIEDMAN, *Assistant Examiner.*

U.S. Cl. X.R.

260—268